US012716650B2

(12) United States Patent
Berra et al.

(10) Patent No.: US 12,716,650 B2
(45) Date of Patent: Aug. 25, 2026

(54) POWER GENERATION PROCESS UTILIZING FUEL, LIQUID AIR AND/OR OXYGEN WITH ZERO $CO_2$ EMISSIONS

(71) Applicant: SAIPEM S.P.A., Milan (IT)

(72) Inventors: Matteo Berra, Milan (IT); Lorenzo Bruno, Milan (IT)

(73) Assignee: Saipem S.P.A., Milan (IT)

(*) Notice: Subject to any disclaimer, the term of this patent is extended or adjusted under 35 U.S.C. 154(b) by 471 days.

(21) Appl. No.: 18/247,405

(22) PCT Filed: Sep. 30, 2021

(86) PCT No.: PCT/IB2021/058984

§ 371 (c)(1),
(2) Date: Mar. 30, 2023

(87) PCT Pub. No.: WO2022/070124

PCT Pub. Date: Apr. 7, 2022

(65) Prior Publication Data

US 2023/0408192 A1 Dec. 21, 2023

(30) Foreign Application Priority Data

Oct. 1, 2020 (IT) ........................ 102020000023167

(51) Int. Cl.
*F25J 3/00* (2006.01)
*F25J 1/00* (2006.01)
(Continued)

(52) U.S. Cl.
CPC ......... *F25J 3/04533* (2013.01); *F25J 1/0012* (2013.01); *F25J 1/0027* (2013.01); *F25J 1/0222* (2013.01); *F25J 1/0234* (2013.01); *F25J 1/0251* (2013.01); *F25J 1/0278* (2013.01); *F25J 3/04612* (2013.01); *F25J 3/04842* (2013.01); *F05D 2260/42* (2013.01); *F23L 2900/07001* (2013.01); *F25J 2210/40* (2013.01); *F25J 2210/50* (2013.01); *F25J 2220/82* (2013.01);
(Continued)

(58) Field of Classification Search
CPC ...... F25J 1/0027; F25J 1/0204; F25J 2210/70; F25J 2240/82; F02C 3/20
See application file for complete search history.

(56) References Cited

U.S. PATENT DOCUMENTS

| | | | | |
|---|---|---|---|---|
| 5,664,411 | A | 9/1997 | Shao | |
| 10,047,673 | B2 * | 8/2018 | Allam | C01B 32/60 |

(Continued)

FOREIGN PATENT DOCUMENTS

| | | | | | |
|---|---|---|---|---|---|
| DE | 19728151 | A1 * | 1/1999 | | F02C 3/20 |
| DE | 10330859 | A1 | 2/2004 | | |

(Continued)

OTHER PUBLICATIONS

International Search Report for International Patent Application No. PCT/IB2021/058984, mailed Feb. 2, 2022.

*Primary Examiner* — Brian M King
(74) *Attorney, Agent, or Firm* — Armstrong Teasdale LLP

(57) ABSTRACT

A system which integrates a power production system and an energy storage system represented by gas liquefaction systems is provided.

17 Claims, 10 Drawing Sheets

(51) Int. Cl.
*F25J 1/02* (2006.01)
*F25J 3/04* (2006.01)

(52) U.S. Cl.
CPC ........ *F25J 2230/08* (2013.01); *F25J 2235/50* (2013.01); *F25J 2240/82* (2013.01); *F25J 2240/90* (2013.01); *F25J 2250/40* (2013.01); *F25J 2250/50* (2013.01); *F25J 2260/80* (2013.01)

(56) References Cited

U.S. PATENT DOCUMENTS

| | | | | |
|---|---|---|---|---|
| 2001/0015061 | A1 | 8/2001 | Viteri et al. | |
| 2013/0340472 | A1 | 12/2013 | De Cayeux et al. | |
| 2017/0016668 | A1* | 1/2017 | Pierre, Jr. .............. | F25J 1/0042 |
| 2018/0080379 | A1* | 3/2018 | Conlon .................. | F25J 1/0045 |
| 2018/0221807 | A1* | 8/2018 | Sinatov .................. | F25J 1/0242 |

FOREIGN PATENT DOCUMENTS

| | | | |
|---|---|---|---|
| EP | 0831205 | A2 | 3/1998 |
| JP | H0448185 | A | 2/1992 |
| KR | 102048844 | B1 | 11/2019 |

* cited by examiner

POWER GENERATION PROCESS UTILIZING FUEL, LIQUID AIR AND/OR OXYGEN WITH ZERO $CO_2$ EMISSIONS

CROSS-REFERENCE TO RELATED APPLICATIONS

This application is a National Stage Application of International Patent Application No. PCT/IB2021/058984, having an International Filing Date of Sep. 30, 2021, which claims priority to Italian Application No. 102020000023167, filed Oct. 1, 2020, the entire contents of each of which are hereby incorporated by reference herein.

TECHNICAL FIELD OF THE INVENTION

The present invention is applied to the energy field, in particular it integrates power production technologies and storage technologies.

BACKGROUND ART

It is known that electrical energy production and network stability rely on a variety of sources and technologies, first and foremost including thermal fuel power plants of various nature, nuclear, hydroelectric, wind, solar power plants, etc.

Peculiar aspects of each of these sources are mainly:

production flexibility, i.e., how much the energy output based on the demand can vary and with what inertia, the availability of the source needed to produce electrical energy over time, the environmental impact, in terms of pollutants being harmful to health and greenhouse gas emissions (mainly $CO_2$).

Each of the aspects mentioned above corresponds to a constraint in the possibility of exploiting the energy source at issue; indeed:

the energy demand is not constant over time, therefore the power plants must have the necessary flexibility to either increase or decrease the production based on the energy demand, the supply of energy from the source at issue may be more or less difficult, either for market issues or for geopolitical reasons or inherent in the nature of the source itself, the environmental impact limits its diffusion in percentage terms in the energy mix.

Based on these three aspects, the energy sources and the related exploitation technologies can be classified into:

either rigid or flexible, where rigid technologies are typically large thermal power plants, whether of the combustible fuel or nuclear type, which encounter major difficulties in load variation, especially if it is required abruptly. Conversely, small turbogas power plants are flexible and, even more so are the hydroelectric power plants;

the continuous or intermittent power plants, where thermo-electric and hydroelectric power plants are examples of continuity, whilst solar and wind power plants are discontinuous;

high or low emissions power plants, where combustion power plants are examples of high-emission power plants, as opposed to solar and wind power plants, which have virtually no emissions.

The rigidity and discontinuity of the energy sources are responsible for a misalignment between supply and demand and the consequent instability of the electrical power network, overloaded with energy which is impossible to be utilized by a small demand at certain times and others in which it is not sufficiently supplied.

The issue of emissions, on the other hand, is increasingly driving the replacement of thermo-electric combustion technologies with sources having a lower environmental impact, mainly solar and wind, which aggravate the problem of instability of the electrical power network because of their discontinuity.

Nowadays, the strategy to make the network stable consists of covering the demand peaks by means of hydroelectric and turbogas power plants which, by virtue of higher flexibility and less inertia in load variations, are particularly suitable for this purpose.

However, hydroelectric technology is mature and little space remains for its further diffusion, while turbogas power plants are responsible for the emission of large amounts of greenhouse gases.

Research has so far followed separate tracks, studying storage systems for solar and wind energy on the one hand and $CO_2$ sequestration systems for thermal fuel power plants on the other.

One of the most promising storage technologies is the production of liquid air from the excess of electrical energy, to then obtain power therefrom during demand peaks.

This technology is called LAES, standing for Liquid Air Energy Storage, and is shown in FIGS. 1A and 1B.

During storage, a LAES plant exploits the energy from renewable sources to produce liquid air, while in use it obtains power from the previously-stored liquid air.

The energy can be conveniently recovered from the liquid air either through the use of a thermal machine operating between the ambient temperature and the evaporation temperature of the liquid air, which is used as a heat sink or through the following process (FIG. 1A):

1) the liquid air is pumped at high pressure,
2) it is heated by heat exchange with a return air current,
3) it undergoes a final heating to a temperature close to ambient temperature,
4) it undergoes an expansion up to super-critical pressure through a power-producing machine,
5) part of the expanded air is sent to the exchanger mentioned under 2) above and re-liquefied,
6) the remaining part of the air undergoes further expansion, through a power generating machine, to low pressure, and before being released into the atmosphere, gives its frigories in favor of the recycling current,
7) the current liquefied under 5) is laminated to the storage pressure: one part will evaporate and be released into the atmosphere after recovering the frigories, while the other part will remain stored.

The recent technologies in the area of carbon dioxide sequestration are based on combustion in an artificial atmosphere, mainly composed of carbon dioxide and oxygen, which for this reason is referred to as oxy-combustion.

In order to accomplish the oxy-combustion, oxygen from the atmosphere must be separated from nitrogen by means of a very energy-intensive process known in the art.

Known energy production systems by means of oxy-combustion are the Graz cycle and the Allam cycle.

The operation of an oxy-combustion turbogas power plant according to the Graz cycle is diagrammatically shown in FIG. 2, and can be described through the following steps:

1) burning a fuel in an appropriate combustor in an atmosphere of $CO_2$, $H_2O$, and $O_2$ at high pressure, with the conversion of the fuel and oxygen to carbon dioxide and water,
2) expanding the combustion gases in a machine which produces power and reduces the temperature of the combustion gases,
3) recovering heat from the exhaust fumes by means of a Rankine steam cycle,
4) further expanding the fumes in a power-producing machine,
5) condensing the water vapor from the fumes expanded in the preceding step,
6) re-compressing the exhaust fumes, composed of $CO_2$ and water, through a sequence of compression stages; at the appropriate pressure, the $CO_2$ produced in the combustion is tapped and sent to the sequestration operations; the remaining part of the exhaust fumes are further compressed until reaching an appropriate temperature, at which an inter-stage refrigeration is performed with the water being the motor fluid of the Rankine cycle,
7) finally compressing the remaining part of exhaust gases to combustor pressure,
8) recycling the exhaust gases to the combustor,
9) instead, the water condensed mentioned under 5) is pumped (the excess amount formed in the combustion is instead removed from the system) and pre-heated in the interstage refrigeration operation mentioned under 6),
10) then treating it according to known methods to make it suitable for steam generation,
11) then pumping it at high pressure and sending it to the heat recovery mentioned under 3), where it becomes steam,
12) expanding the steam in a turbine up to the pressure of the combustor mentioned under 1), and injected into the latter.

The production process of $O_2$ fed to the combustor is known in the art, and cryogenic air distillation is typically employed for large amounts.

Therefore, the Graz cycle comprises a Rankine steam cycle, which implies the release of large amounts of heat at low temperature, thus compromising the heat recovery efficiency.

A solution to this problem is offered by the Allam cycle, in which the elimination of the Rankine cycle is suggested.

As shown in the diagram in FIG. 3:

1) burning a fuel in an appropriate combustor in an atmosphere of $CO_2$, $H_2O$, and $O_2$ at high pressure, with the conversion of the fuel and oxygen to carbon dioxide and water,
2) expanding the combustion gases in a machine which produces power and reduces the temperature of the combustion gases,
3) recovering heat from the exhaust fumes by means of the carbon dioxide recirculated to the combustor mentioned under 1),
4) further cooling the exhaust fumes and separating the condensed water,
5) re-compressing the exhaust fumes, mainly consisting of $CO_2$ to supercritical pressure,
6) cooling the fumes mentioned under 5) to sub-critical temperature,
7) pumping the liquid carbon dioxide to the appropriate pressure to return it to the combustor mentioned under 1),
(8) heating the $CO_2$ mentioned under 7) in the thermal recovery operation mentioned under 3).

The process of producing $O_2$ fed to the combustor belongs to the prior art, and cryogenic air distillation is typically employed for large amounts.

The oxy-combustion process is configured as an energy production system, possibly to be used to cover network demand peaks but is not an energy storage system per se.

Furthermore, this system also greatly suffers from the operations of separating oxygen from nitrogen and liquefying a portion of the $CO_2$, which results in an efficiency reduction from a theoretical 58% of a combined cycle, without $CO_2$ sequestration, to 35%.

Furthermore, the Rankine steam cycle for recovering heat from exhaust fumes is limited in efficiency by the significant condensation heat of water, as noted by the inventors of the Allam cycle, in addition to requiring a long series of operations to condition the water and dispose of the additives injected into the latter.

Furthermore, the $CO_2$ obtained from the process is either gaseous, as in the case of the Graz cycle, or liquid, only at high pressure, therefore an additional treatment is needed for it to be stored.

LAES technology requires a significant energy expenditure for the production of liquid air estimated at 0.45 kW/kg, which strongly limits the amount of recoverable energy: the efficiency of a LAES system demonstrated to date is about 15%.

Prior document EP 0 831 205 describes the generation of a gas in a combustor from a fluid containing carbon and/or hydrogen and/or oxygen and from a gas containing at least hydrogen, thus obtaining a fluid which is expanded to produce electrical energy and then fed to a carbon dioxide recovery system.

Prior document DE 103 30 859 describes a semi-closed $CO_2$ cycle for the production of electrical energy, in which a compressor compresses the circulating gas, which is then fed to a turbine after passing through a combustion chamber, in which a boiler for heat recovery is present; the residual heat contained in the expanded exhaust gases is used to generate steam and/or hot water.

Prior document KR 102 048 844 describes a liquefied air regasification system comprising a carbon dioxide scavenging apparatus, where such an apparatus is inserted into a commercial power plant to separate and remove environmental contaminants from the exhaust gases, and a liquefied air regasification apparatus in order to increase the efficiency of environmental contaminant separation and removal while producing additional electrical energy.

SUMMARY OF THE INVENTION

The inventors of the present patent application have surprisingly found that oxy-combustion technologies can be synergistically integrated with liquid air energy storage (LAES) technologies, by means of a highly efficient process, which allows obviating the problem of fluctuations in the demand and production of electrical energy, and thus providing a stabilizing effect of the electrical power network, further promoting the use of renewable energy.

OBJECT OF THE INVENTION

According to a first object, the present invention describes a process for producing power by using a high-pressure gas turbine, and liquefying one or more gases, which employs a first and a second working fluid.

In a second object, the present invention describes a variant of the process, in which a medium-pressure gas turbine is employed.

In a third object, the present invention describes a variant of the process, in which a low-pressure gas turbine is employed.

According to further objects of the invention, each process is described according to a first embodiment, in which said liquefaction comprises a step of direct heat exchange between said gas and said second working fluid, while in a second embodiment, said liquefaction comprises a step of indirect heat exchange between said gas and said second working fluid.

DETAILED DESCRIPTION OF THE INVENTION

Figure 1A:
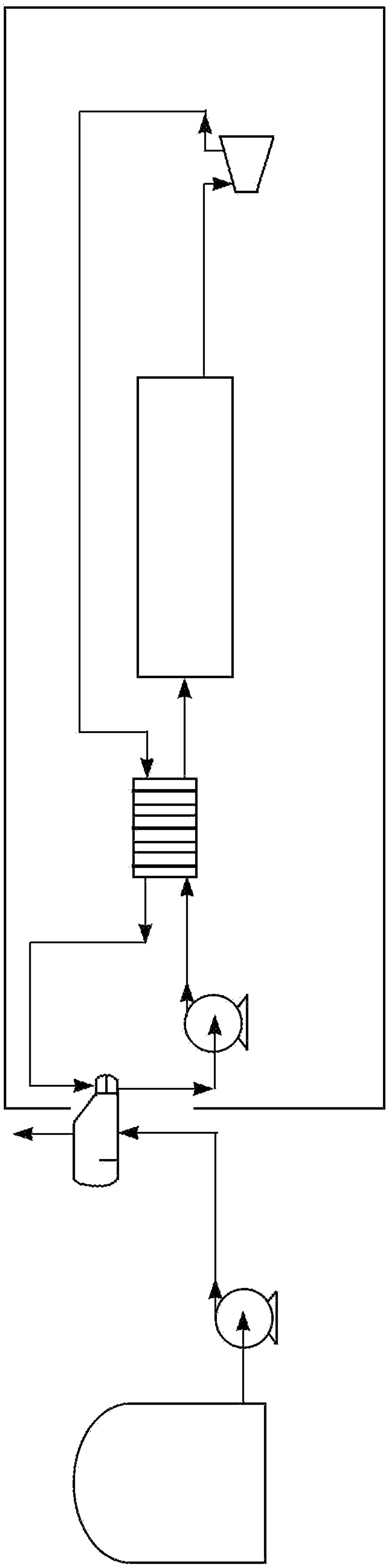
FIGS. 1A and 1B show two examples of LAES systems.
Figure 1B:
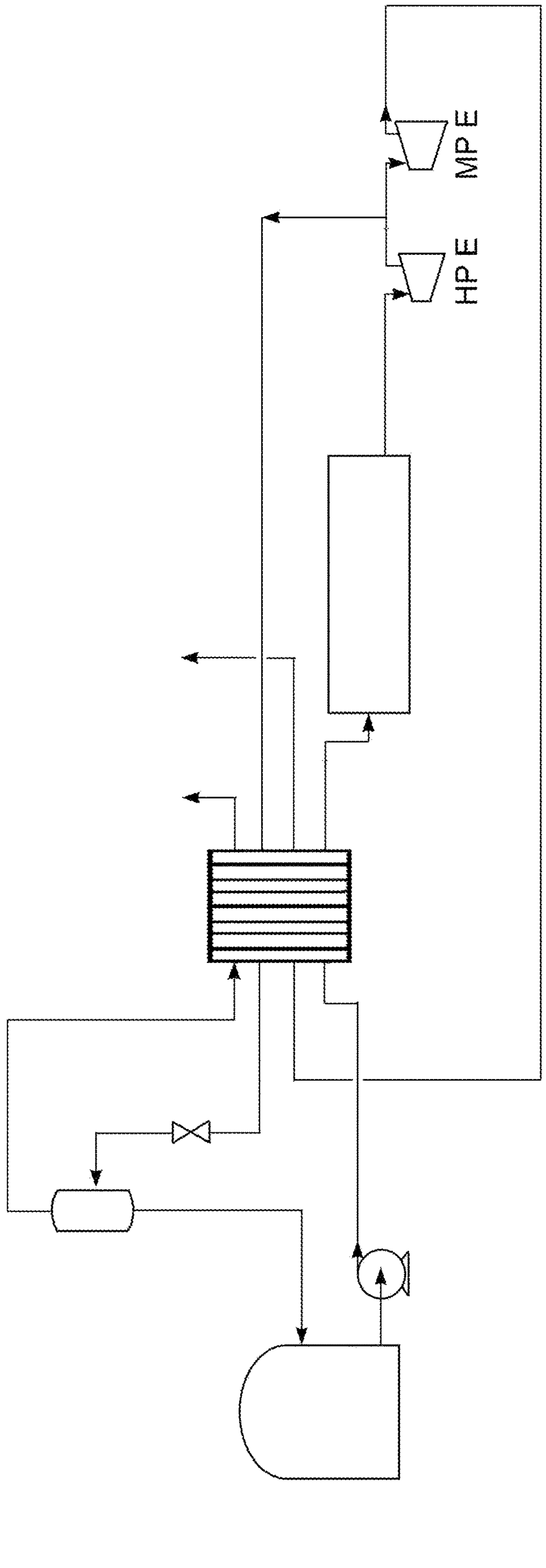
Figure 2:
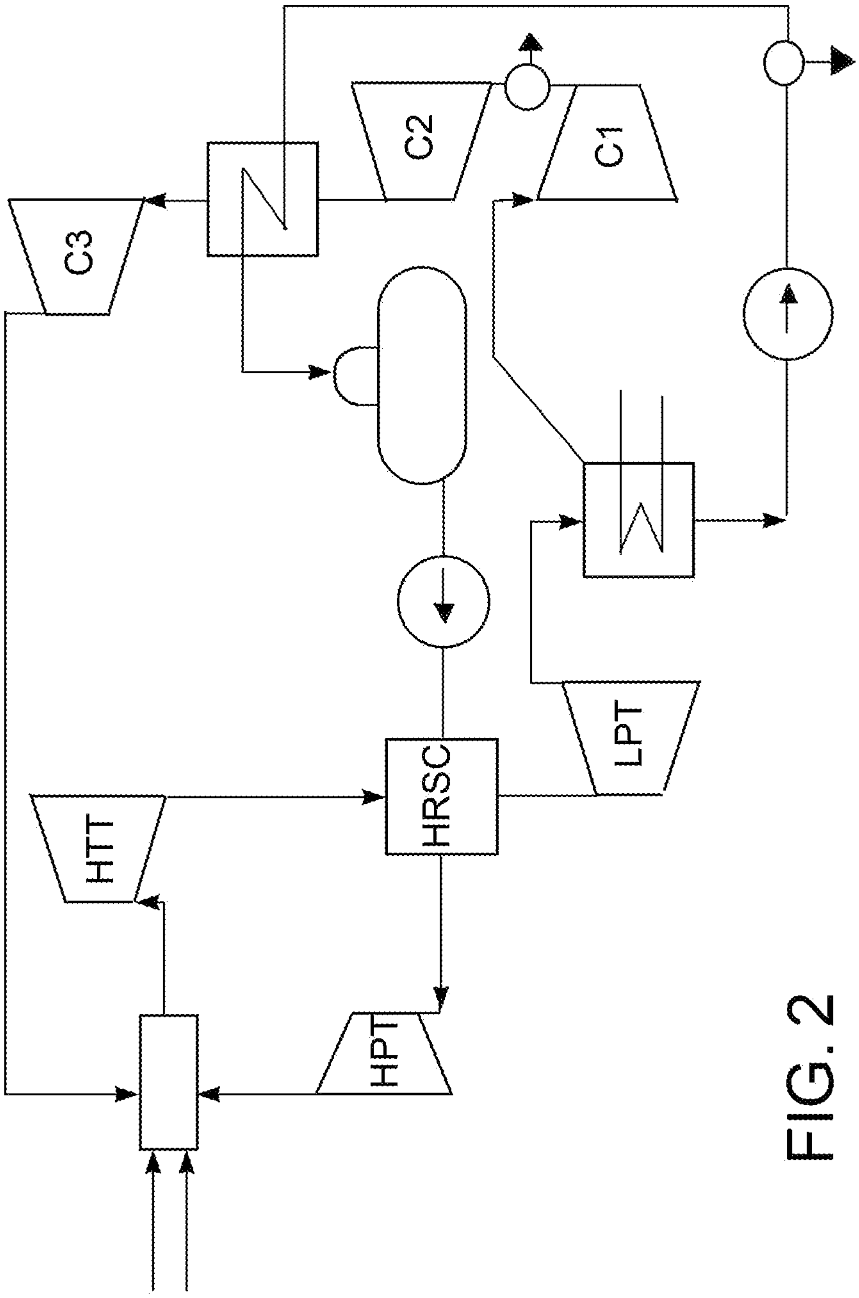
FIG. 2 shows an example diagram of a Graz cycle.
Figure 3:
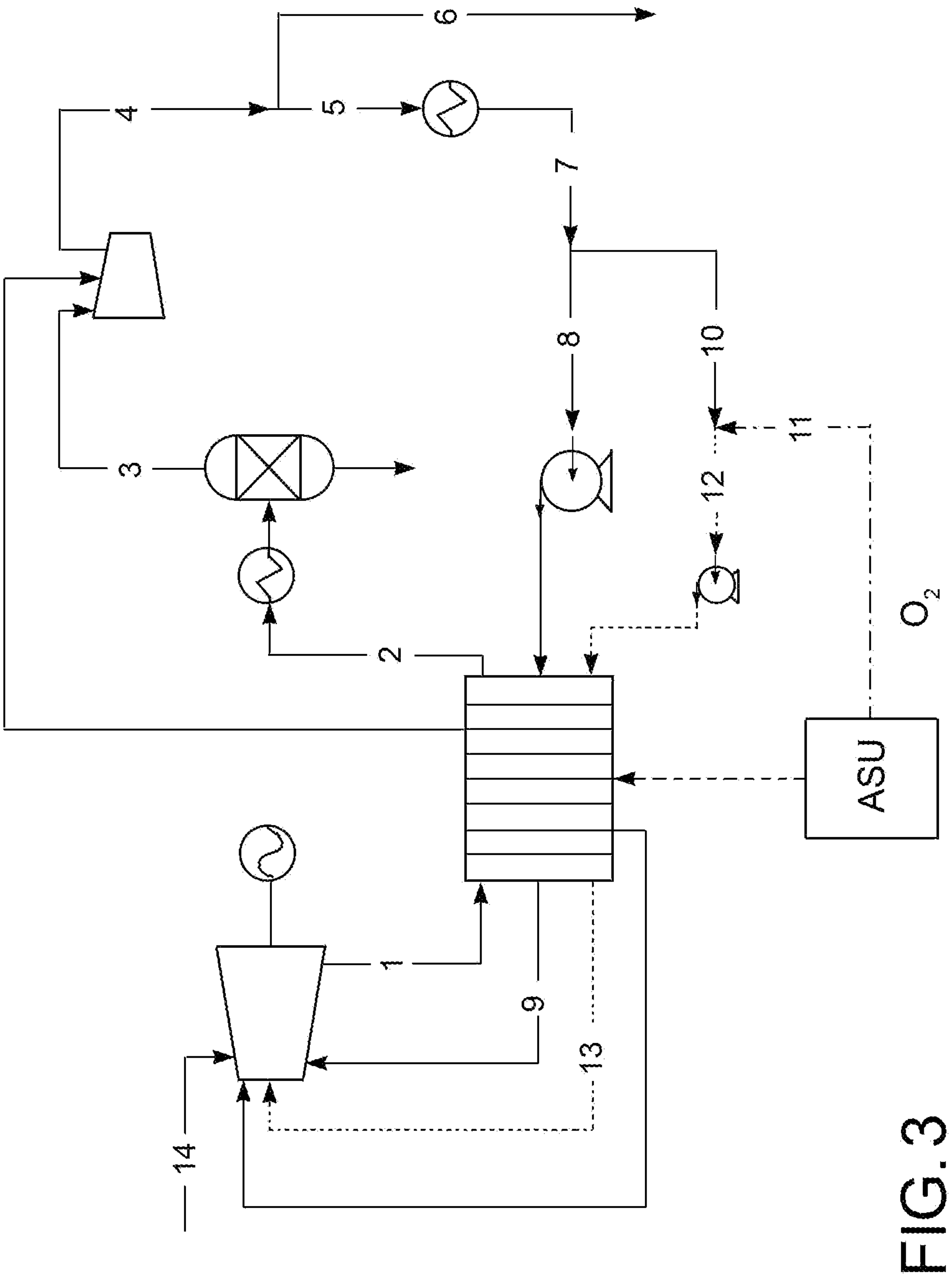
FIG. 3 shows an example diagram of an Allam cycle.

According to a first object of the invention, a process for producing power and liquefying one or more gases is described.

In particular, such a method comprises the steps of:

1) producing, in a combustor COMB, an exhaust gas 1 comprising water vapor and $CO_2$,
2) expanding said exhaust gas 1 in a first expander EX1 with power production, thus obtaining an exhaust gas 2,
3) cooling the expanded exhaust gas 2 thus obtained in a heat recovery unit WHRU, thus obtaining a cooled exhaust gas 3 and the partial condensation of the water vapor contained therein,
4) separating the condensed water vapor 4 in a first separator S1, thus obtaining a partially dehydrated exhaust gas 5,
5) pumping a portion of the condensed water vapor 4' by means of a first pump P1 and recycling it to said combustor COMB,
6) cooling said partially dehydrated exhaust gas 5 in a first heat exchanger TE1, thus obtaining a further cooled exhaust gas 6 and the partial condensation of the aqueous vapor contained therein,
7) separating a second portion of the condensed water vapor 7 in a second separator S2, thus obtaining a further dehydrated exhaust gas 8,
8) subjecting said further dehydrated exhaust gas 8 to a yet further dehydration in a dehydration unit DHU, thus obtaining an exhaust gas 9 mainly composed of $CO_2$,
9) liquefying the $CO_2$ in said exhaust gas 9 mainly composed of $CO_2$ in a liquefaction unit LU and obtaining a liquid $CO_2$ flow 11,
10) separating a portion 12 of said liquefied $CO_2$ flow and recycling it to said combustor COMB.

For the purposes of the present invention, step 1) can be achieved by the combustion of an appropriate fuel F at high pressure in an atmosphere of $CO_2$ and $O_2$.

In step 2), the power generated by the expander, represented by a gas turbine, can be converted into electrical and/or mechanical energy according to techniques known in the field.

For the purposes of the present invention, such a power can be converted into electrical energy by using a high-pressure gas turbine.

In particular, a high-pressure gas turbine operates at pressures of about 100-900 barg.

For the purposes of the present invention, in step 3), inside the heat recovery unit WHRU, the cooling of the expanded exhaust gas 2 is obtained by virtue of the heat exchange with a first working fluid.

More in particular, the cooling may be achieved by means of one or a plurality of successive heat exchange steps with said first working fluid.

According to a preferred aspect of the invention, after each heat exchange step, and irrespective of the other steps, said first working fluid may be expanded in a respective step of expansion.

Therefore, according to the present invention, each step of heat exchange may occur with said first working fluid in unexpanded form or in expanded form after one or more successive steps of heating and possible respective expansion.

For the purposes of the present invention, in particular, said steps of heat exchange are first implemented with said first working fluid in an expanded form after one or more steps of expansion, irrespective of the number of steps of heat exchange and possible expansion and then with said first working fluid in an unexpanded form.

Since said first working fluid is heated after each step of heat exchange, the successive steps of heat exchange involve a first working fluid flow which is more and more heated, as well as possibly more expanded.

In an embodiment of the invention, said step 3) comprises: a first, a second, a third, and a fourth heat exchange between said expanded exhaust gas 2 and said first working fluid, as will be described in greater detail below.

For the purposes of the present invention, said first working fluid is liquid air.

As for step 4), the separation between $CO_2$ and condensed water vapor is achieved in the first separator S1 according to techniques known in the art.

As for step 5) of recycling the portion of condensed water vapor 4' separated in the first separator S1 to the combustor COMB, this is conducted after pumping by means of a first pump P1, thus obtaining a high-pressure flow 4".

For the purposes of the present invention, before being sent to the combustor COMB, said high-pressure condensed water vapor flow 4" can be subjected to one or a plurality of steps of heat exchange with the expanded exhaust gas 2 inside the heat recovery unit WHRU, thus obtaining a high-pressure heated water vapor flow 4".

As for step 8), the yet further dehydration of the further dehydrated exhaust gas 8 is conducted in order to obtain a $CO_2$ flow with a water content of less than 500 ppm and preferably less than 50 ppm.

The flow obtained from step 8) is a flow of exhaust gas 9 mainly composed of $CO_2$, being composed of $CO_2$ at least in 90% molar amount.

In particular, such a step 8) is conducted according to techniques known in the field.

For the purposes of the present invention, the step 9) of liquefying the $CO_2$ includes using both the first working fluid and the second working fluid.

For the purposes of the present invention, said second working fluid is liquid oxygen; for example, said second working fluid flow is liquid oxygen having a purity over 90% and preferably over 95%.

In particular, said step 9) comprises a heat exchange between said exhaust gas 9 mainly composed of $CO_2$ and said first and second working fluids.

A liquid $CO_2$ flow is thus obtained from step 9), which for the purposes of the present patent application can also be referred to as pure $CO_2$; indeed, such a flow comprises only traces of other components, such as oxygen, nitrogen, and argon.

According to a first embodiment of the invention, said heat exchange with the first and second working fluids is direct.

Anticipating a second embodiment of the invention, described below, the heat exchange between said flow of exhaust gas 9 mainly composed of $CO_2$ with the first and second working fluids is indirect.

As described above, in a first embodiment, the liquefaction of $CO_2$ in step 9) is conducted by direct heat exchange between said flow of exhaust gas 9 mainly composed of $CO_2$ and said first and second working fluids.

In particular, said step 9) is conducted inside a liquefaction unit LU.

For the purposes of the present invention, step 9) can comprise the sub-steps of:

9a) heat exchanging between said flow of exhaust gas 9 mainly composed of $CO_2$ and said first and said second working fluids in a second exchanger LUTE, thus obtaining a cooled flow 10 mainly composed of $CO_2$, 9b) separating said cooled flow 10 mainly composed of $CO_2$ in a third biphasic separator S3 thus obtaining a liquid $CO_2$ flow 11 from the bottom and a first gaseous phase 14 rich in $CO_2$ from the head, 9c) compressing said first gaseous phase 14 rich in $CO_2$ in a first compressor C1, thus obtaining a first compressed gaseous phase 15, which is then cooled in the second exchanger LUTE by heat exchange with the first and second working fluids, thus obtaining a flow of said first compressed and cooled mixed phase 16, 9d) separating said flow of the first compressed and cooled mixed phase 16 in a fourth biphasic separator S4, thus obtaining a flow of head gas 17 of the fourth biphasic separator, which is released into the atmosphere, and, from the bottom, a second liquid phase 18 rich in $CO_2$, which is combined, following a lamination by means of a lamination valve V1, with the cooled flow 10 mainly composed of $CO_2$ obtained from step 9a) to be sent to the third biphasic separator S3 of step 9b).

In an aspect of the invention, the step 9a) includes cooling the flow 9 mainly composed of $CO_2$ to a temperature between the triple point of $CO_2$ and −40° C.

In an aspect of the invention, steps 9c) and 9d) are optional.

In another aspect of the invention, steps 9c) and 9d), if conducted, can be repeated multiple times, if required and justified by the need to achieve an effective $CO_2$ separation and an acceptable plant complexity.

In particular, the colling steps 9a) and 9c) are preferably conducted in the same exchangers of the $CO_2$ liquefaction unit LUTE.

In step 9d), the gas flow 17 released into the atmosphere mainly consists of oxygen, argon, nitrogen, and non-separated $CO_2$.

A liquid $CO_2$ flow 11 and partially heated first and second working fluids are thus obtained from step 9).

After the heat exchange of step 9), the second working fluid, which is oxygen, is then sent to the combustor COMB for step 1).

As for the liquid $CO_2$ flow 11, this is removed from the system and possibly stored according to the most appropriate methods.

A portion of said liquefied $CO_2$ flow 12 is instead recycled to the combustor COMB, after pumping by means of a second pump P2, thus obtaining a high-pressure liquid $CO_2$ flow 13 (or a recycling $CO_2$ portion).

For the purposes of the present invention, before being sent to the combustor COMB, said portion 13 of high-pressure $CO_2$ is used in the step 6) of cooling the partially dehydrated exhaust gas 5 in the first exchanger TE1, thus obtaining a high-pressure heated $CO_2$ portion 13'.

After this step, the high-pressure $CO_2$ portion 13' is used in the step 3) of cooling the expanded exhaust gas 2 inside the heat recovery unit WHRU, as described in greater detail below.

As indicated above, the step 3) of heat exchange in the heat recovery unit WHRU between the expanded exhaust gas 2 and the first working fluid comprises either one or a plurality of steps.

According to an embodiment of the invention, said step 3) comprises a first (step 3a), a second (step 3b), a third (step 3c), and a fourth (step 3d) heat exchange.

Figure 4A:
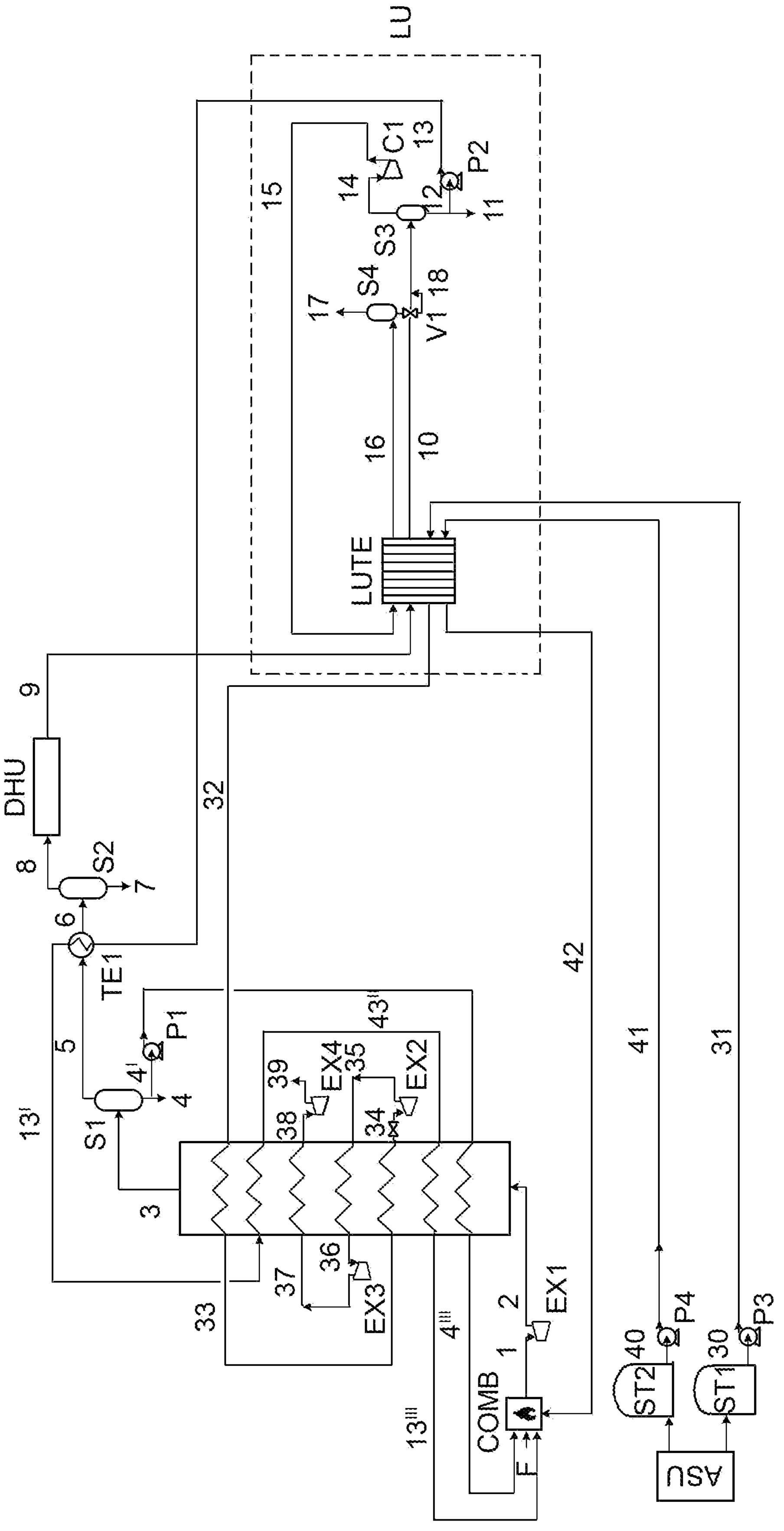
FIG. 4A shows a first embodiment of the invention, a variant of which is shown in FIG. 4B.

Indeed, as shown for example in FIG. 4A, from a storage ST1, a flow 30 of the first working fluid is pumped at high pressure by a third pump P3, thus obtaining a flow of the first high-pressure working fluid 31.

Such a flow of the first high-pressure working fluid 31 is employed for cooling the flow 9 mainly composed of $CO_2$ inside the second exchanger LUTE, thus obtaining a heated flow of the first working fluid 32; such a flow 32 is then employed in the step 3) of cooling the expanded exhaust gas 2.

In particular, according to an embodiment of the invention, a first heat exchange 3*a*) is implemented with the expanded exhaust gas 2, thus obtaining a flow of the partially heated first working fluid 33.

Such a flow of the first partially heated working fluid 33 is employed in a second step of heat exchange 3*b*) with the expanded exhaust gas 2, thus obtaining a flow of the first further heated working fluid 34, which is then expanded in a second expander EX2.

The further heated and expanded flow 35 thus obtained is employed in a third step of heat exchange 3*c*) with the expanded exhaust gas 2, thus obtaining a flow of the first even more heated working fluid 36, which is then expanded in a third expander EX3 thus obtaining an even more heated and expanded flow 37.

Such a flow of the first further heated and expanded working fluid 37 performs a fourth step of heat exchange 3*d*) with the expanded exhaust gas 2, thus obtaining a flow of the first working fluid 38 in gaseous phase, which is then expanded in a fourth expander EX4.

The expanded working flow 39 in gaseous phase thus obtained is then released into the atmosphere or employed for other purposes.

For example, it can be employed for the regeneration of molecular sieves possibly employed in the dehydration of the incoming air for the liquid air or oxygen production operations, thus contributing to a greater integration between electrical energy storage and production technologies.

According to the above description, further heat exchanges may be conducted within the heat recovery unit WHRU.

In particular, such further heat exchanges involve:

the high-pressure condensed vapor flow 4";

the flow of the high-pressure and heated portion 13' of liquid $CO_2$.

In particular, the high-pressure condensed flow 4" is employed in a fifth step of further cooling the expanded exhaust gas 2.

As for the recycling $CO_2$ portion 13', this is employed in one or a plurality of further heat exchanges with the expanded exhaust gas flow 2.

In particular, such heat exchanges are conducted in counterflow, and therefore the expanded exhaust gas flow 2 will conduct heat exchanges with a less and less cold portion 13' of heated recycling $CO_2$.

According to an embodiment of the present invention, said portion 13' of $CO_2$ is employed in a sixth heat exchange, thus obtaining a flow of further heated $CO_2$ 13", and in a seventh heat exchange with the expanded exhaust gas 2 inside the heat recovery unit WHRU, thus obtaining a flow of even more heated $CO_2$ 13'".

Therefore, according to an embodiment of the present invention, the expanded exhaust gas 2 is subjected, in the heat recovery unit (WHRU), to the following steps of cooling:

with the first working fluid, in one, two, three, or four, or more steps;

with the portion of condensed and possibly pumped water vapor 4", in one or more steps;

with the flow of high-pressure and heated (or recycling) liquid $CO_2$ 13' in one, two, or more steps.

More in particular, the expanded exhaust gas 2 can be sequentially subjected to the following cooling steps:

I) a heat exchange with the portion 4" of condensed water vapor at high pressure, II) a heat exchange with the flow of further heated recycled $CO_2$ 13", III) a heat exchange with the first working fluid (step 3b), IV) a heat exchange with the first further heated and expanded working fluid 35 (step 3c), V) a heat exchange with the first even more heated and expanded working fluid 37 (step 3d), VI) a heat exchange with the recycled $CO_2$ flow 13', VII) a heat exchange with the first heated working fluid 32 exiting the second exchanger LUTE (step 3a).

For the purposes of the present invention, each of the above steps may be repeated or may be optional.

For the purposes of the present invention, the two working fluids are produced in a preceding step according to methods known in the art, e.g., in an air separation unit (ASU) and in an air liquefaction unit, to be then stored in appropriate tanks, possibly at a pressure above atmospheric pressure.

As described above, in the step 9) of $CO_2$ liquefaction, a second working fluid is employed in addition to the first working fluid.

In particular, said second working fluid, once produced in an air liquefaction unit, is stored in an appropriate tank ST2, possibly at a higher pressure than atmospheric pressure.

A flow of said second working fluid 40 is drawn from the tank ST2 and pumped at high pressure by a fourth pump P4, thus obtaining a flow 41 of the second high-pressure working fluid which is sent to the exchanger of the liquefaction unit LUTE for step 9a).

More in particular, the oxygen can be pumped at a slightly higher pressure than that of the combustor, while the liquid air is pumped at an even higher pressure, e.g., at a pressure up to 300 barg and preferably at a pressure of about 20-300 barg.

After the heat exchange, the flow 42 of the second heated working fluid thus obtained is sent to the combustor COMB for step 1).

Figure 4B:
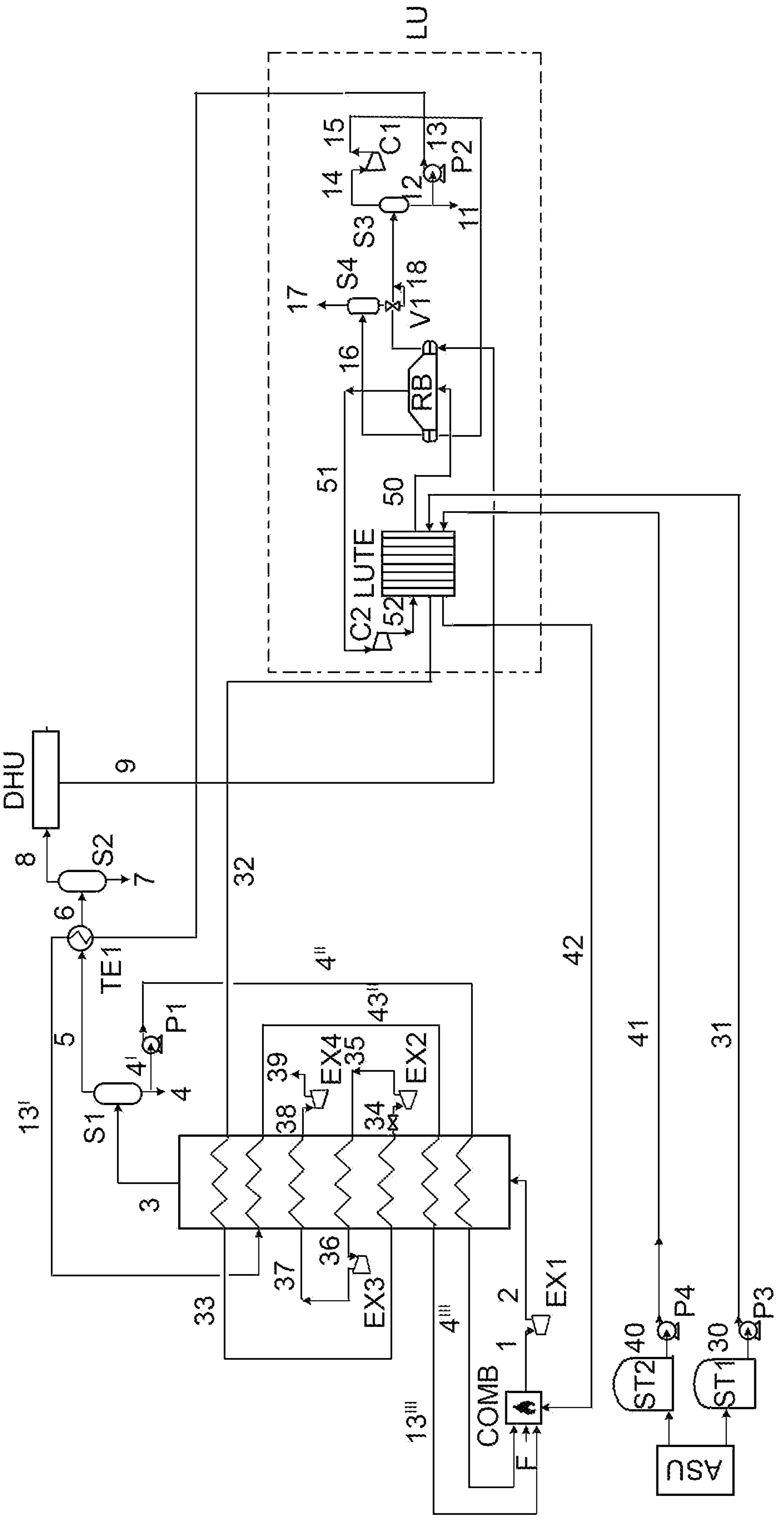

According to an alternative embodiment of the present invention, for example depicted in FIG. 4B, the liquefaction of $CO_2$ in step 9) is a step 9') conducted by indirect heat exchange of said flow 9 mainly composed of $CO_2$ with said first and said second working fluids.

Indeed, said heat exchange is mediated by a refrigerant vector fluid RF.

For the purposes of the present invention, said refrigerant vector fluid RF is chosen from the group comprising: $CF_4$, argon, R32, R41, R125, etc.

In particular, said step 9') is conducted inside a liquefaction unit LU.

For the purposes of the present invention, step 9') can comprise the sub-steps of:

9'0) obtaining, by cooling in a second exchanger LUTE, a cooled flow 50 of a refrigerant vector fluid RF by heat exchange with the pumped flow of the first working fluid 31 and the pumped flow of the second working fluid 41, 9'a) cooling, in a refrigerant bath RB, the flow of gas 9 mainly composed of $CO_2$, by heat exchange with said cooled flow of refrigerant vector fluid 50, thus obtaining a cooled flow 10 mainly composed of $CO_2$ and a flow of heated refrigerated vector fluid 51, 9'b) separating said cooled flow 10 mainly composed of $CO_2$ in a third separator S3, with the separation of a bottom flow 11 of liquid $CO_2$ and a first gaseous phase 14 from the head, 9'c) compressing said first gaseous phase 14 in a first compressor C1, thus obtaining a first compressed gaseous phase 15, which is then cooled in the same refrigerant bath RB, by heat exchange with the flow of cooled refrigerant vector fluid 50, thus obtaining a heated refrigerant vector fluid 51 and a compressed and cooled mixed phase 16, 9'd) separating said compressed and cooled mixed phase 16 in a fourth biphasic separator S4, thus obtaining a flow of head gas 17, which is released into the atmosphere, and a second liquid phase 18 from the bottom, which is combined, following a lamination by means of the lamination valve V1, with the cooled flow 10 mainly composed of $CO_2$ obtained from step 9'a) to be sent to the third separator S3 for step 9'b).

For the purposes of the present invention, the flow 9 mainly composed of $CO_2$ of step 9'a) is the $CO_2$ flow obtained from step 8).

In an aspect of the invention, the step 9'a) of $CO_2$ liquefaction includes cooling it to a temperature between the triple point of $CO_2$ and −40° C.

In an aspect of the invention, steps 9'c) and 9'd) are optional.

According to another aspect of the invention, steps 9'c) and 9'd), if conducted, can be repeated multiple times, if required and justified by the need to achieve an effective $CO_2$ separation and an acceptable plant complexity.

In particular, step 9'a) and step 9'c) are conducted in the same refrigerant bath RB.

In step 9'd), the gas flow 17 released into the atmosphere mainly consists of oxygen, argon, nitrogen, and the non-separated $CO_2$.

As for the heated refrigerant fluid flow 51 obtained after the step 9') of heat exchange with the flow 9 mainly composed of $CO_2$, this is subjected to compression in a second compressor C2 and then cooled in step 9'0).

According to a second object, the invention describes a variant of the process described above.

Figure 5A:
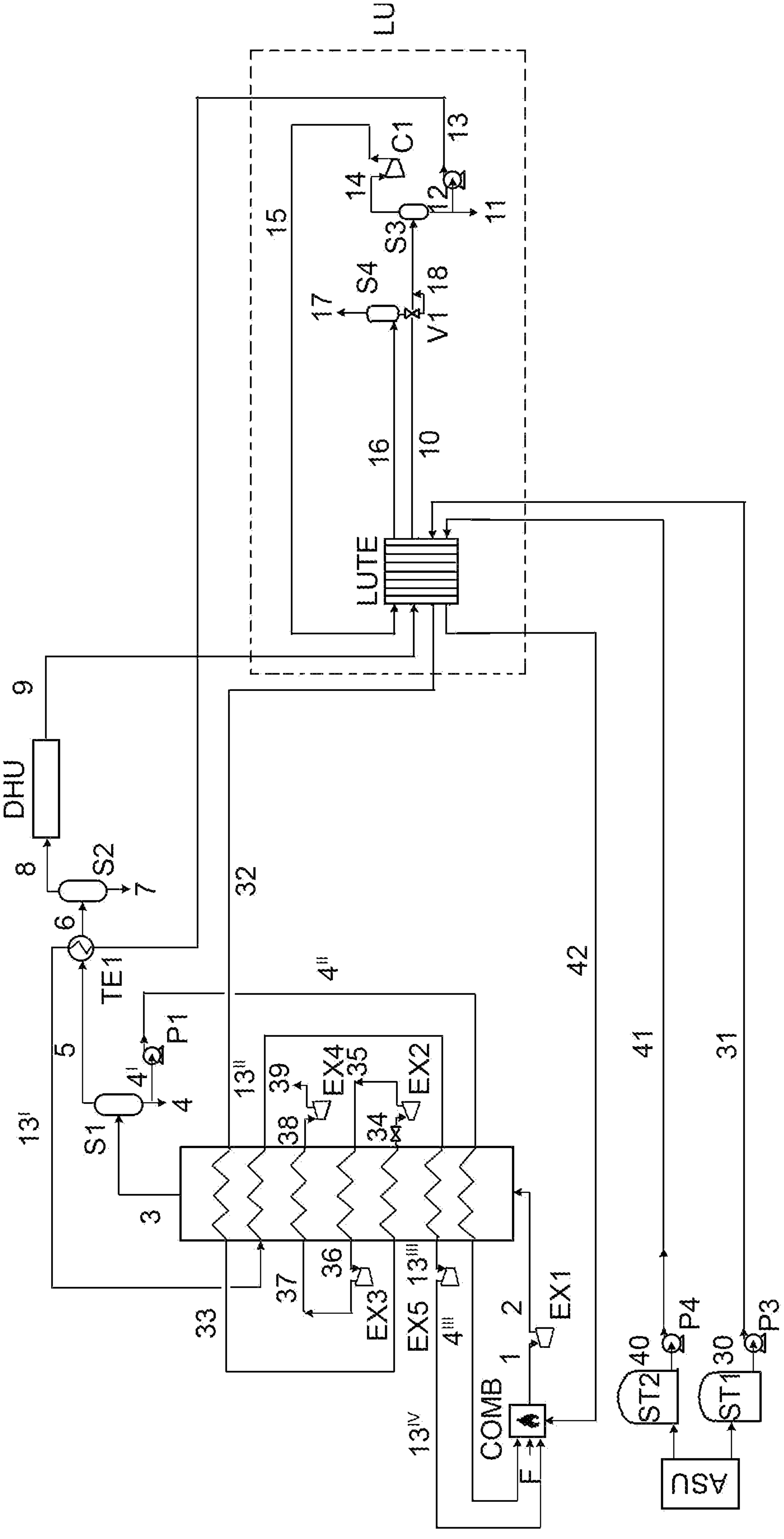
FIG. 5A shows a second embodiment of the invention, a variant of which is shown in FIG. 5B.

In particular, as shown in FIG. 5A, such a process comprises a step of expanding the heated flow of $CO_2$ 13''', obtained after the seventh heat exchange, in a fifth expander EX5 with power generation, thus obtaining an expanded flow $\mathbf{13}^{iv}$ recycled to the combustor COMB.

For the purposes of the present invention, the embodiment described above comprises the use of medium-pressure gas turbines which operate at pressures of about 35-100 barg.

Advantageously, such a process configuration thus allows the use of machines with established and commercially widely available technology.

According to an aspect of the present invention, such a configuration may provide for the step 9) of $CO_2$ liquefaction to be conducted by direct heat exchange between the $CO_2$ flow and the first and second heat exchange/cooling fluids, as described above.

In another aspect of the present invention, such a configuration may provide for the step 9) of $CO_2$ liquefaction to be a step 9') conducted by indirect heat exchange, by using a refrigerant vector fluid RF, between the $CO_2$ flow and the first and second heat exchange/cooling fluids, as described above.

According to the present invention, a variant of the above process is described.

Figure 6A:
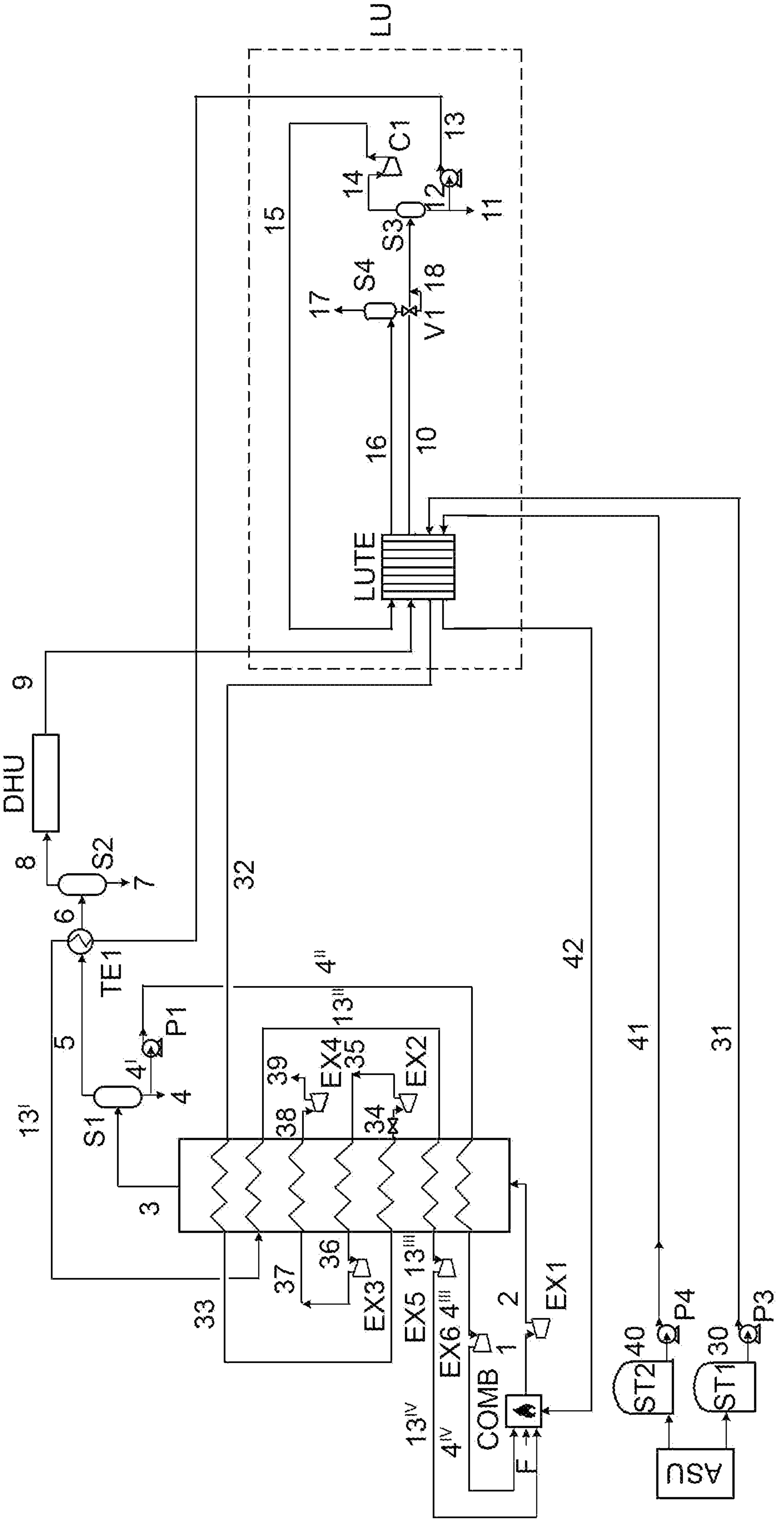
FIG. 6A shows a third embodiment of the invention, a variant of which is shown in FIG. 6B.

In particular, as depicted in FIG. 6A, the process of the invention comprises a step 5b) in which the heated water vapor flow 4'', before being recycled to the combustor COMB, is expanded in a sixth expander EX6, thus obtaining a heated and expanded flow $\mathbf{4}^{iv}$ with power production.

For the purposes of the present invention, the embodiment described above comprises the use of low-pressure gas turbines which operate up to about 35 barg.

Advantageously, such a process configuration thus allows the use of machines with established and commercially widely available technology.

According to an aspect of the present invention, depicted for example in FIG. 6A, such a configuration may provide for the step 9) of $CO_2$ liquefaction to be conducted by indirect heat exchange between the $CO_2$ flow and the first and second working fluids, as described above.

Figure 6B:
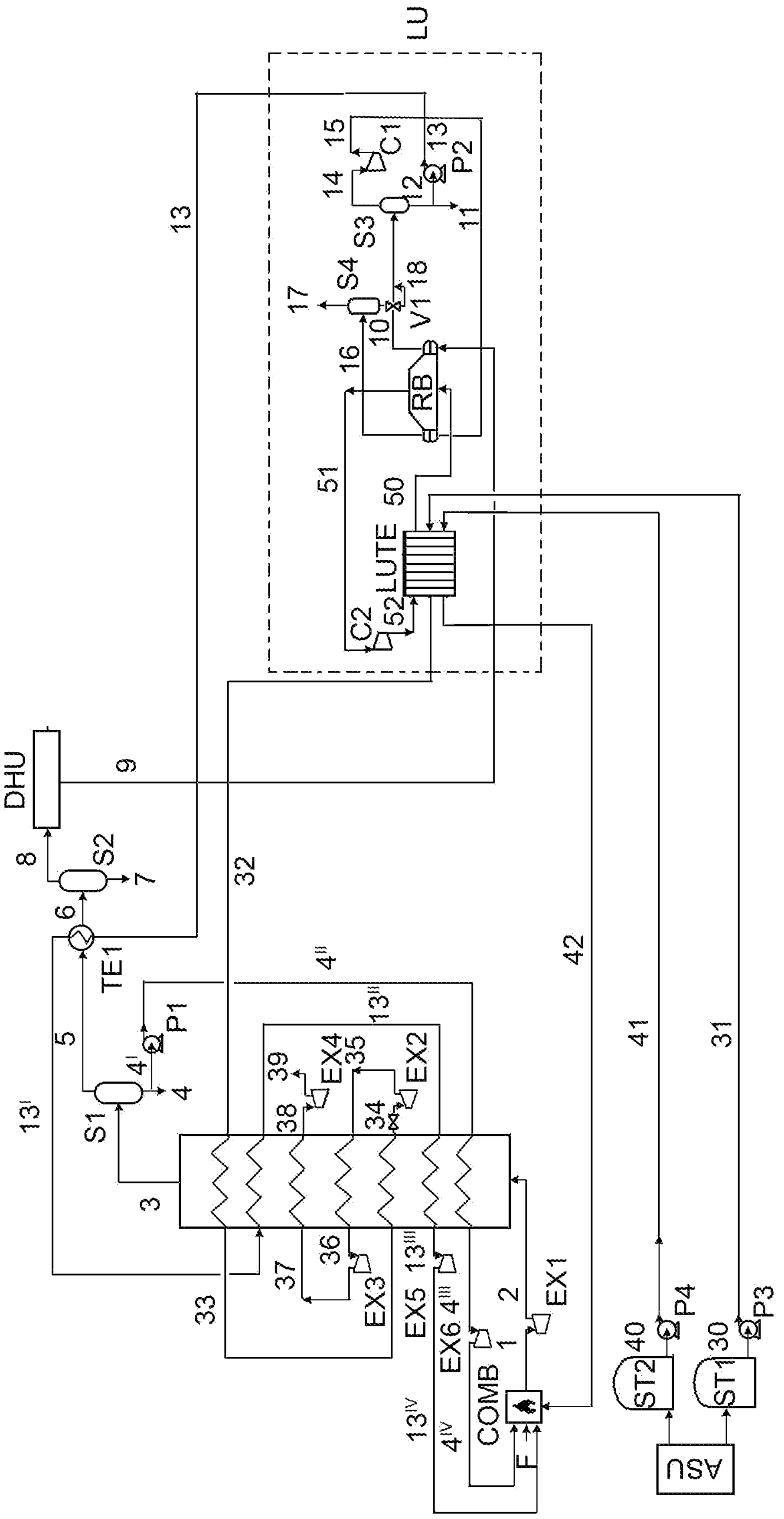

In another aspect of the present invention, depicted for example in FIG. 6B, the step 9) of $CO_2$ liquefaction to be a step 9') conducted by indirect heat exchange, using a refrigerant vector fluid, between the $CO_2$ flow and the first and second working fluids, as described above.

Examples of embodiments according to the above description are diagrammatically depicted in the figures.

In particular, the diagram in FIG. 4A provides the use of high-pressure gas turbines in the expansion in the first expander EX1, while the $CO_2$ liquefaction unit comprises an exchanger LUTE, in which a direct heat exchange with liquid oxygen and liquid air is conducted.

The diagram in FIG. 4A provides the use of high-pressure gas turbines, while the $CO_2$ liquefaction unit comprises a refrigerant bath RB, in which an indirect heat exchange with liquid oxygen and liquid air is conducted.

In particular, the diagram in FIG. 5A provides the use of medium-pressure gas turbines in the expansion of the exhaust gas in the combustor COMB in the first expander EX1, while the $CO_2$ liquefaction unit comprises an exchanger LUTE, in which a direct heat exchange with liquid oxygen and liquid air is conducted.

Figure 5B:
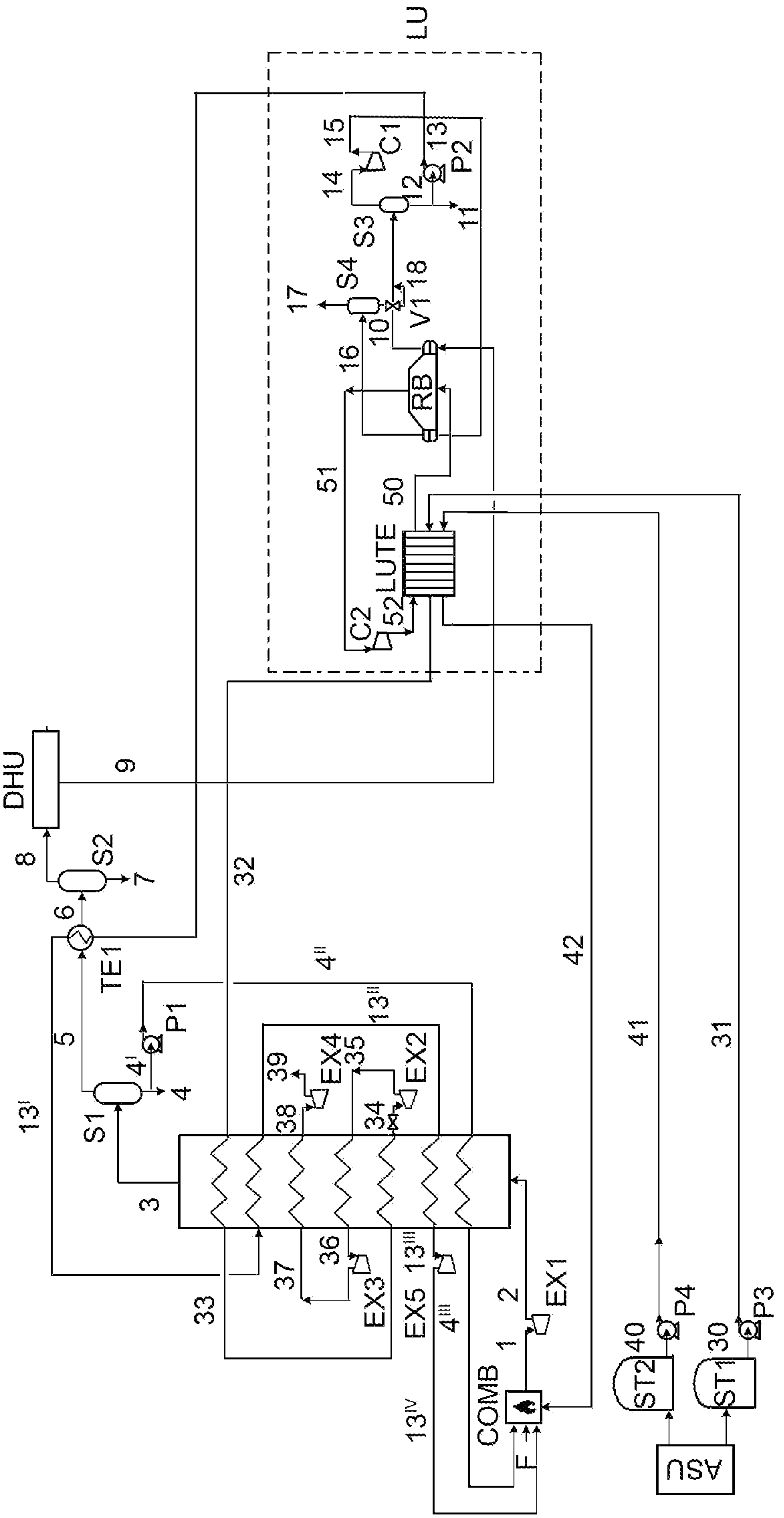

The diagram in FIG. 5B provides the use of medium-pressure gas turbines in the expansion of the exhaust gas produced in the combustor COMB in the first expander EX1, while the $CO_2$ liquefaction unit comprises a refrigerant bath RB, in which an indirect heat exchange with liquid oxygen and liquid air is conducted.

In particular, the diagram in FIG. 6A provides the use of low-pressure gas turbines in the expansion of the exhaust gas produced in the combustor COMB in the first expander EX1, while the $CO_2$ liquefaction unit comprises an exchanger, in which a direct heat exchange with liquid oxygen and liquid air is conducted.

The diagram in FIG. 6B provides the use of low-pressure gas turbines in the expansion of the exhaust gas produced in the combustor COMB in the first expander EX1, while the $CO_2$ liquefaction unit comprises a condenser, in which indirect heat exchange with the liquid oxygen and the liquid air is conducted.

From the description provided above, the advantages offered by the present invention will be apparent to a person skilled in the art.

From the plant engineering point of view, the described process allows eliminating the Rankine cycle for the recovery of heat from the exhaust turbine fumes and simplifying the plant, especially if the Rankine cycle uses water as an engine fluid.

Furthermore, the process is particularly suitable for off-shore applications.

According to the integration of an oxy-combustion plant for energy production with a LAES storage, the present invention allows creating a synergy between a system for storing electrical energy, which is in excess of demand at certain times, and a system for producing electrical energy to be fed into the network during periods of increased demand.

In particular, the synergy is demonstrated in the higher efficiency than the efficiency offered by the simple sum of the individual technologies.

One of the most obvious advantages is the possibility of leveling and stabilizing the network, i.e., making its production continuous and aligning the supply with the demand for electrical energy.

By virtue of the stabilizing effect of the electrical power network, the system of the invention promotes further use of renewable energy.

Therefore, this combination allows overcoming the known problems in the industry, while ensuring zero environmental impact.

The integration of oxy-combustion and liquid air energy storage (LAES) technologies results in an energy production battery which combines the merits of both technologies and uses the resulting synergies to eliminate/improve important technical aspects of both.

A particular merit of the present invention is that it achieves an efficiency, with respect to the fuel (calculated based on the LHV), of about 80%, which is particularly high compared to conventional oxy-fuel combustion layouts.

With respect to fuel use, compared to traditional oxy-combustion layouts, the process described increases the life of non-renewable resources, extending the time available for the energy transition.

What is claimed is:

1. A process for producing power and liquefying a gas, the process comprising:

1) producing, in a combustor, an exhaust gas comprising water vapor and $CO_2$, 2) expanding said exhaust gas in a first expander generating power, thus obtaining an expanded exhaust gas, 3) cooling the expanded exhaust gas in a waste heat recovery unit (WHRU), thus obtaining a cooled exhaust gas and partial condensation of the water vapor, 4) separating a portion of condensed water vapor in a first separator, thus obtaining a partially dehydrated exhaust gas, 5) pumping the portion of the condensed water vapor separated in the first separator by a first pump and recycling it to said combustor, 6) cooling said partially dehydrated exhaust gas in a first heat exchanger, thus obtaining a further cooled exhaust gas, 7) separating a second portion of the condensed water vapor in a second separator, thus obtaining a further dehydrated exhaust gas, 8) subjecting said further dehydrated exhaust gas to further dehydration, thus obtaining an exhaust gas mainly composed of $CO_2$, 9) liquefying the $CO_2$ in said exhaust gas mainly composed of $CO_2$ in a liquefaction unit (LU), thus obtaining a liquefied $CO_2$ flow, and 10) separating a portion of said liquefied $CO_2$ flow and recycling it to said combustor, wherein, during step 2), the generated power is converted into electrical energy and/or mechanical energy, wherein during step 3), inside the WHRU, cooling of the expanded exhaust gas is obtained by heat exchange with a first working fluid pumped from a first working fluid storage tank, and wherein said cooling is obtained by one or a plurality of successive heat exchange steps with the first working fluid, and wherein, in step 9), said liquefying is performed using the first working fluid and a second working fluid for heat exchange with the $CO_2$, wherein the second working fluid is oxygen and is pumped from a second working fluid storage.

2. The process of claim 1, wherein, in step 3), said cooling is obtained by a plurality of successive heat exchange steps, and after each heat exchange step, said first working fluid is expanded during a respective expansion step conducted in a respective expander.

3. The process of claim 1, wherein in step 3), said cooling is obtained by a plurality of successive heat exchange steps, and each of the heat exchange steps occurs with said first working fluid in unexpanded form or in expanded form after one or more successive steps of heating, and optional respective expansion.

4. The process of claim 1, wherein in step 3), said cooling is obtained by a plurality of successive heat exchange steps with the first working fluid which comprise, in succession:

3a) obtaining, by a first heat exchange, a partially heated flow of the first working fluid;

3b) obtaining, by a second heat exchange with the expanded exhaust gas, a further heated flow of the first working fluid, which is then expanded in a second expander, thus obtaining a further heated and expanded working flow;

3c) obtaining, by a third heat exchange, an even more heated flow of the first working fluid, which is then expanded in a third expander, thus obtaining an even more heated and expanded working flow; and 3d) obtaining, by a fourth heat exchange, a flow of the first working fluid in a gaseous phase, which is then expanded in a fourth expander.

5. The process of claim 1, wherein said first working fluid is liquid air.

6. The process of claim 1, wherein step 5) results in obtaining a high-pressure condensed water vapor.

7. The process of claim 6, wherein said high-pressure condensed water vapor is employed in the WHRU to cool the expanded exhaust gas, thus obtaining a flow of heated water vapor.

8. The process according to of claim 1, wherein step 9) comprises:

9a) exchanging heat between said exhaust gas mainly composed of $CO_2$ and said first working fluid and the second working fluid in a second exchanger, thus obtaining a cooled flow mainly composed of $CO_2$, 9b) separating said cooled flow mainly composed of $CO_2$ in a third biphasic separator, with separation of the liquefied $CO_2$ flow from the bottom, and of a first gaseous phase rich in $CO_2$ from a head of said third biphasic separator, 9c) compressing said first gaseous phase rich in $CO_2$ in a first compressor, thus obtaining a first compressed gaseous phase, which is then cooled in the second exchanger by heat exchange with the first and second working fluids, thus obtaining a flow of first compressed and cooled mixed phase, and 9d) separating, in a fourth biphasic separator, said flow of said first compressed and cooled mixed phase, thus obtaining a flow of head gas, which is released into the atmosphere, and a second liquid phase rich in $CO_2$ from the bottom, which is combined, following a lamination by a lamination valve, with the cooled flow mainly composed of $CO_2$ obtained from step 9a) and sent to the third biphasic separator for step 9b).

9. The process of claim 1, wherein said portion of said liquefied $CO_2$ flow is employed in step 6) of cooling the partially dehydrated exhaust gas in the first heat exchanger, thus obtaining a high-pressure and heated portion of $CO_2$.

10. The process of claim 9, wherein said high-pressure and heated portion of $CO_2$ is employed the WHRU to cool said expanded exhaust gas in one or in a plurality of cooling steps.

11. The process of claim 10, wherein said high-pressure and heated portion of $CO_2$ is employed in further heat exchanges with the expanded exhaust gas inside the WHRU, thus obtaining a flow of further heated $CO_2$.

12. The process of claim 8, wherein, in step 9a) heat exchange is direct.

13. The process of claim 8, wherein, in step 3), there is used the flow of the first heated working fluid obtained after step 9a).

14. The process of claim 1, wherein, in step 9), heat exchange is indirect and mediated by a refrigerant vector fluid.

15. The process of claim 14, wherein step 9) is a step 9'), comprising the sub-steps of:

9'0) obtaining, by cooling in a second exchanger, a cooled flow of the refrigerant vector fluid by heat exchange with a pumped flow of the first working fluid and a pumped flow of the second working fluid, 9'a) cooling, in a refrigerant bath, the exhaust gas mainly composed of $CO_2$, by heat exchange with said cooled flow of the refrigerant vector fluid, thus obtaining a cooled flow mainly composed of $CO_2$ and a flow of heated vector fluid, 9'b) separating said cooled flow mainly composed of $CO_2$ in a third separator, with separation of the liquefied $CO_2$ flow from the bottom, and of a first gaseous phase from a head of said third separator, 9'c) compressing said first gaseous phase in a first compressor, thus obtaining a first compressed gaseous phase, which is then cooled in the refrigerant bath, by heat exchange with the cooled flow of the refrigerant vector fluid, thus obtaining a heated refrigerant vector fluid and a compressed and cooled mixed phase, and 9'd) separating said compressed and cooled mixed phase in a fourth biphasic separator, thus obtaining a flow of head gas, which is released into the atmosphere, and a second liquid phase from the bottom, which is combined, following a lamination by a lamination valved, with the cooled flow mainly composed of $CO_2$ obtained from step 9'a) to be sent to the third separator for step 9'b).

16. The process of claim 11, further comprising:

further heating the further heated $CO_2$ to obtain an even more heated $CO_2$; and expanding the flow of even more heated $CO_2$ in a fifth expander, with power generation, thus obtaining an expanded flow recycled to the combustor COMB.

17. The process of claim 7, wherein the flow of heated water vapor is expanded in a sixth expander, with power production.

* * * * *